United States Patent Office 3,314,879
Patented Apr. 18, 1967

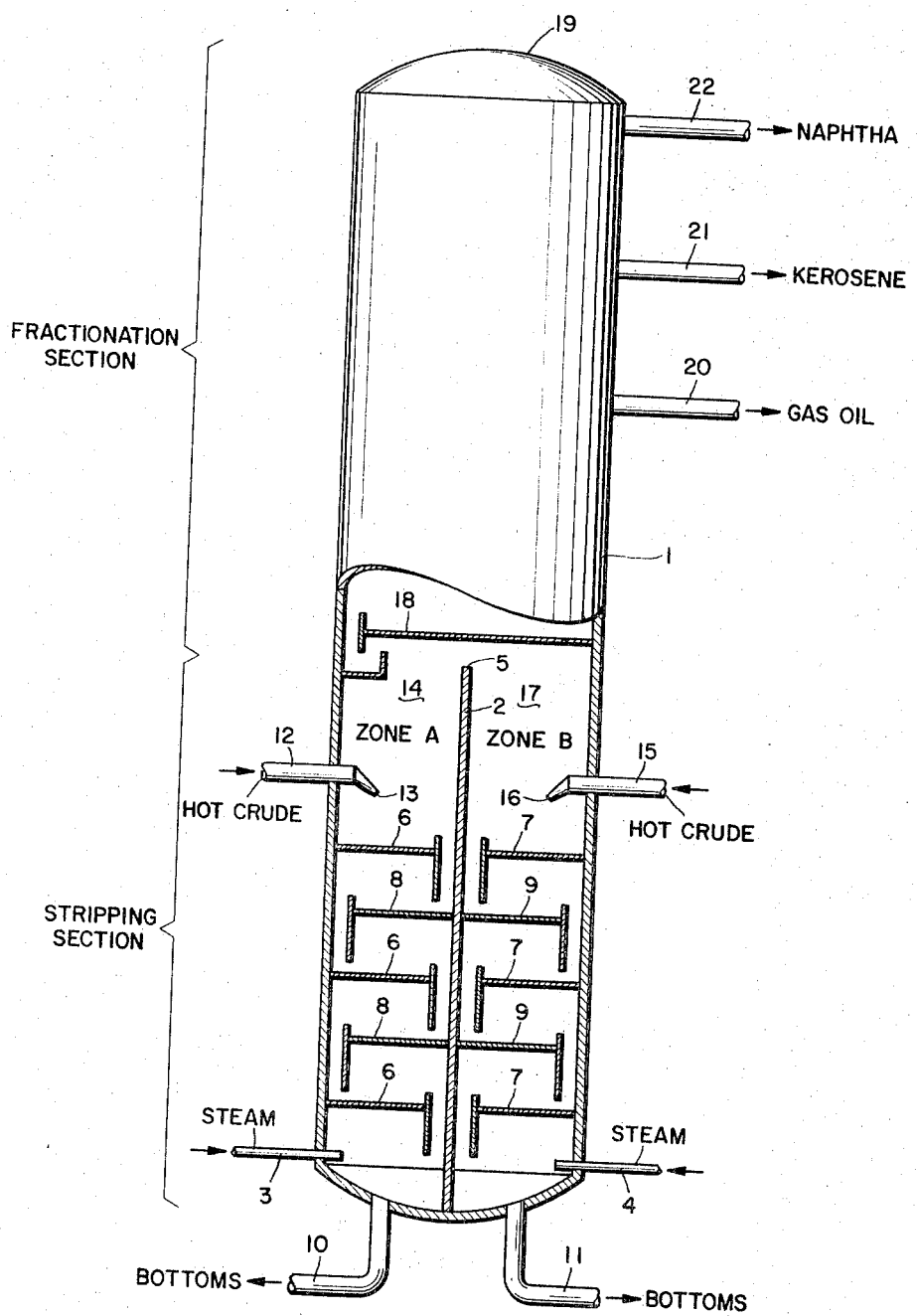

3,314,879
FRACTIONATION PROCESS AND APPARATUS
Richard Kenneth Lacy, Morristown N.J., and Clark Henry Zakovi, Stanford, Calif., assignors to Esso Research and Engineering Company, a corporation of Delaware
Filed Mar. 10, 1965, Ser. No. 438,652
4 Claims. (Cl. 208—356)

This invention relates to an improved process and apparatus for processing crude oils. More particularly, the invention relates to an improved process and apparatus for distilling two crude oils in a single fractionation tower.

Petroleum refiners seek to take advantage of various crude oil sources by establishing as much processing flexibility as they can consistent with the product mix required. Each time the crude oil or a component of a mixed crude oil entering a refinery changes, arrangements must be made to vary refinery streams and the operation of refining units.

When a refiner has two crudes available the conventional alternate practices are to mix the crudes; to alternate crudes in blocked operation, or to partially process one crude so that its characteristics are sufficiently similar to the other so that they can be processed in the same manner. All these alternative methods of operation have severe limitations due to the additional expense, additional processing steps and the numerous changes which must be considered throughout the refinery.

We have developed a process and apparatus for simultaneously distilling two crude oils having different characteristics in a single fractionation tower. The invention permits complete segragation of bottoms fractions and complete blending of the lighter materials in the fractionation section of the tower. Each bottoms fraction can be further treated in the best manner commensurate with the value of the fraction without resorting to additional large scale separation steps. The lighter materials are composed of the most valuable components of both crudes and these can be removed from the fractionator as side streams and overhead for further processing into end products.

Referring to the drawing, reference numeral 1 designates the shell of an upright fractionation tower. The tower is composed of two principal internal sections designated the fractionation section and the stripping section. The stripping section is divided into two separate and distinct side-by-side stripping zones by baffle plate 2. The first stripping zone is designated zone A. The second stripping zone is designated zone B. Steam enters stripping zone A from steam line 3 and passes up through the zone. Steam enters stripping zone B from steam line 4 and passes up through the zone. Thus, the stripping zones extend from the point where the steam enters to the top 5 of the baffle plate. In the drawing, the baffle plate has been placed so that it divides the stripping section into two approximately equal zones, but in practice the plate can be placed so that the volumes of the zones vary from 1 to 1 to 10 to 1. When the fractionation tower is of the conventional cylindrical shape a horizontal section through one of the zones will be a segment of a circle. Zones A and B contain a plurality of stripping trays shown generally by reference numerals 6 and 7 attached to the shell alternating with a plurality of stripping trays shown generally by reference numerals 8 and 9 attached to the baffle plate. This arrangement is designed to separate the two stripping zones into a plurality of stripping stages. Bottoms are removed from zone A through line 10 and from zone B through line 11.

Reference numeral 12 designates a first inlet conduit which supplies a first hot crude oil through tangential nozzle 13 to flash section 14 located in the uppermost portion of stripping zone A. Reference numeral 15 designates a second inlet conduit which supplies a second hot crude oil through tangential nozzle 16 to flash section 17 located in the uppermost portion of stripping zone B. The crude oils are fed to the fractionation tower at temperatures ranging from 450° to 800° F., but it is an advantage of the invention that the crudes can be at different temperatures and the temperature spread can be 5° to 100° F. Since the fractionation tower is at atmospheric pressure and the crudes enter at a line pressure of from about 5 to about 40 p.s.i.g., the more volatile materials boiling above about 550° to 700° F. flash into the fractionation section as gases, vapors and entrained liquid.

The fractionation section extends from the first fractionation tray 18 to the top of the tower 19. The fractionation section consists of a plurality of trays, baffles, bubble caps, wiers and downcomers arranged in conventional fashion. Fractionation products are taken off as side streams as shown generally by lines 20 and 21 and as overhead as shown generally by line 22. The number and type of fractionation trays, bubble caps, the fractionation conditions, reflux technique, number and location of side streams, flow rate, etc. are those which are used in conventional engineering practice and can be selected from the prior art.

In a preferred embodiment the first fractionation tray 18 is arranged so that it overflows and dumps into the stripper zone containing the less valuable bottoms. This can be done by locating the downcomer of the tray over the stripping zone which receives the low quality bottoms. In this way the more valuable bottoms material is maintained in uncontaminated form.

The apparatus shown in the drawing typically operates in the following manner: A first petroleum crude oil having a gravity of 40.2 degrees API, a viscosity of 3.65 centistokes at 100° F., a viscosity of 0.56 centistoke at 210° F. and a sulfur content of 0.5 wt. percent is fed through line 12 and nozzle 13 into the first zone (zone A) of the stripping section of the fractionation tower. The first crude oil is considered to have low value bottoms because the bottoms have a high pour point and can only be used as low grade industrial fuel oil. A second petroleum crude oil having a gravity of 27.1 degrees API, a viscosity of 21.4 centistokes at 100° F., a viscosity of 5.4 centistokes at 210° F. and a sulfur content of 4.5 wt. percent is fed through line 15 and nozzle 16 into the second zone (zone B) of the stripping section of the fractionation tower. This second crude is considered to have high value bottoms because the bottoms contain a high percentage of asphalt base material as well as low pour point characteristics essential for high grade fuel oils. The higher boiling materials in the crudes boiling below about 700° F. pass down through their respective stripping zones. The first bottoms fraction having relatively low value is removed by line 10 and goes to industrial fuel oil. The second bottoms fraction having relatively high value is removed by line 11 and goes to asphalt processing units and/or blending.

The lower boiling materials in the crudes boiling above about 600° to about 700° F. flash upward from flash zones 14 and 17 into the fractionation section. These materials together with strippings from the stripping zones are condensed on the fractionation trays. The various fractions distribute themselves in the various fractionation stages in accordance with the conventional fractionation mechanism involving mass transfer between upflowing vapors and downflowing condensed liquids. A gas oil fraction boiling in the range of from about 650° to about 450° F. is removed as a side stream by line 20. A kerosene fraction boiling in the range of from about 350° to about 450° F. is removed as a side stream by line 21. A light naphtha and gas fraction boiling above about 350° F. is removed as overhead by line 22.

By employing the process and apparatus described above we have fractionated two very diverse crude oils in a single tower. We have obtained two bottoms fractions in segregated form so that they can be further processed or not depending on their value. Had the two crude oils been mixed for fractionation the bottoms would have been less desirable as fuel because of the high sulfur content and of no value as asphalt due to the high oil content relative to the resin and asphaltene content. Furthermore, by applying our concept we have obtained a number of augmented lighter fractions containing the most valuable light components from each of the crudes. These fractions are now homogeneously blended and ready for immediate further processing as unitary feedstocks.

The concept can be applied to many diverse crudes which are desirable for some particular feature. These include asphalt crudes, lube crudes, wax crudes, gasoline crudes, high sulfur crudes, i.e., 2 to 10 wt. percent sulfur, low sulfur crudes, i.e., .001 to 2 wt. percent sulfur, low metal content crudes, high metal content crudes and crude mixes from different pipelines. Crudes having a gravity of 15 to 45 degrees API are suitable feeds and the gravity difference between two crudes to be fractionated can be 0 to 30 degrees API.

As stated previously the hot crudes are fed to the tower through nozzles which are shaped and placed to provide tangential delivery. This technique of introducing the oil to the tower enhances flashing and prevents the liquids from splashing over the baffle plate or into the fractionation section.

The fractionation process can be carried out at pressures ranging from .1 p.s.i.a. to 500 p.s.i.a. and thus is suitable for atmospheric, vacuum and pressure fractionations.

What is claimed is:

1. An improved process for fractionating petroleum crude oils consisting essentially of the steps of establishing two separate and distinct side-by-side stripping zones in the stripping section of a fractionation tower, introducing a first hot crude oil containing relatively low value bottoms into the flash section of the first stripping zone, introducing a second hot crude oil containing relatively high value bottoms into the flash section of the second stripping zone, simultaneously steam stripping the lighter components from the crude oils as they pass through their respective stripping zones, passing stripped materials from the two independent stripping zones into a common fractionation section, fractionating said stripped materials, recovering at least one fraction from the fractionation section, recovering segregated low value bottoms from the first stripping zone; recovering segregated high value bottoms from the second stripping zone whereby two petroleum crude oils are processed in a single fractionation tower to provide low boiling overhead and side stream products containing the desirable lighter hydrocarbon materials of the two crude oils and to provide segregated bottoms fractions of each crude oil in condition for further appropriate processing of each bottoms fraction.

2. The process according to claim 1 wherein the crude oils fed to the process have a gravity of 15 to 45 degrees API and a gravity difference of 0 to 30 degrees API.

3. The process according to claim 1 wherein the first crude oil contains .001 to 2 wt. percent sulfur and the second crude oil contains 2 to 10 wt. percent sulfur.

4. The process according to claim 1 wherein the crude oils enter the fractionation tower at temperatures ranging from 450° to 800° F. and the temperature spread between the hot oils is 5° to 100° F.

References Cited by the Examiner

UNITED STATES PATENTS

| | | | |
|---|---|---|---|
| 2,651,601 | 9/1953 | Taff et al. | 208—102 |
| 2,760,918 | 8/1956 | Barr | 208—102 |
| 3,110,663 | 11/1963 | Miller | 208—102 |

DELBERT E. GANTZ, *Primary Examiner.*

H. LEVINE, A. RIMENS, *Assistant Examiners.*